United States Patent [19]

Bartels et al.

[11] Patent Number: 5,028,336

[45] Date of Patent: Jul. 2, 1991

[54] SEPARATION OF WATER-SOLUBLE ORGANIC ELECTROLYTES

[75] Inventors: Craig R. Bartels; John Reale, Jr., both of Wappingers Falls, N.Y.

[73] Assignee: Texaco Inc., White Plains, N.Y.

[21] Appl. No.: 318,261

[22] Filed: Mar. 3, 1989

[51] Int. Cl.$^5$ ............................................. B01D 61/58
[52] U.S. Cl. .................................. 210/639; 210/651; 210/804
[58] Field of Search ..................... 210/639, 651, 804

[56] References Cited

U.S. PATENT DOCUMENTS 4,752,363  6/1988  Buckley et al. ..................... 204/131

Primary Examiner—Ivars Cintins
Attorney, Agent, or Firm—Robert A. Kulason; James J. O'Loughlin; Carl G. Seutter

[57] ABSTRACT

Water-soluble organic electrolytes, such as anions of lower carboxylic acids in aqueous solution at low pH, are removed by raising the pH and subjecting the resultant charge liquid to nanofiltration.

15 Claims, No Drawings

SEPARATION OF WATER-SOLUBLE ORGANIC ELECTROLYTES

FIELD OF THE INVENTION

This invention relates to the separation of water-soluble organic electrolytes. More specifically it relates to the treatment of low pH aqueous liquids which contain water-soluble organic electrolytes such as anions of organic acids

BACKGROUND OF THE INVENTION

As well known to those skilled in the art, waste water may contain a wide variety of undesirable components which may restrict its use or disposal by passage to natural bodies of water. Illustrative of industrial waters which may normally be discharged into adjoining bodies of water is the aqueous discharge from an oil production platform. These platforms are constructed in fresh water lakes or more commonly in salt water bodies in which drilling is carried out and in due course production of hydrocarbons. Prior to further treatment of the hydrocarbons it is necessary to separate them from the produced water which may be passed to waste.

Produced water contains a wide variety of components depending upon the details of operation. It may contain dissolved water-soluble salts typified by those present in sea water, which commonly contains the following:

TABLE

| Element | Parts per Million (w) |
| --- | --- |
| Cl | 18,980 |
| Na | 10,561 |
| Mg | 1,272 |
| S | 884 |
| Ca | 400 |
| K | 380 |
| Br | 65 |
| C (inorg) | 28 |
| Sr | 13 |
| ($SiO_2$) | 0.01–7.0 |
| B | 4.6 |
| Si | 0.02–4.0 |
| C (org) | 1.2–3.0 |
| Al | 0.16–1.9 |
| F | 1.4 |

Many other elements may be present in amounts each less than about 1 ppm. See Handbook of Chemistry and Physics (44 Ed) 1962, Page 3488.

Commonly sea water is considered as being a dilute (3.5 w %) solution of sodium chloride.

In typical production platforms, as the hydrocarbon is recovered from the undersea sources, there is recovered a substantial portion of produced water including formation water and injected water. Formation water is that water which is naturally present in the oil or gas reservoir. This may amount to as little as less than 1 v % at the beginning of production but typically increases during the life of the well. Injected water is typically sea water which has been injected into the well to enhance the recovery of hydrocarbon (See for example Somerville et al *Environmental Effect of Produced Water from North Sea Oil Operations* Marine Pollution Bulletin Vol. 18, No 10, pp 549–558 (1987) (Great Britain).

Produced water commonly is found to contain immiscible hydrocarbons, typified by crude petroleum, in amounts of 20–80, say 50 w %; and it may contain, in suspension, insoluble inorganic solids, typically in amounts up to say 0.5 w %, typically 0.01–0.5, say 0.1 w %.

The produced water may also contain 20–40 mg/l of dissolved hydrocarbons including benzene, toluene, and xylene.

A principal undesired component of produced water may be dissolved water-soluble organic electrolytes (WSOE). Produced waters, as found for example in the North Sea or in the Gulf of Mexico, may contain as much as up to about 1 w % WSOE; and commonly they may be found in amount of 30–500 wppm as wppm as measured by the Freon Extraction Oil and Grease Test (ASTM Test method 413.2) and thereafter determining the intensity of the IR carboxylate band.

Upon analysis, the water-soluble organic electrolytes may be found to include: fatty acids, typified by $C_1$–$C_8$ acids such as acetic, propionic, butyric, benzoic, etc. typically as their salts; as well as other anion-forming compounds typified by phenols.

The pH of the produced water is typically below 7 and commonly it is found to be 4–7. A common Gulf of Mexico produced water may be found to have a pH of about 6.

Produced water may contain, as water-soluble organic electrolytes (WSOE), non-hydrocarbon organic matter, largely as salts of lower aliphatic carboxylic acids such as acetic, propionic, butyric acids, commonly in amounts up to about one gram per liter.

The produced water may also contain 20–40 mg/l of dissolved hydrocarbons including benzene, toluene, and xylene. This produced water is accompanied by immiscible hydrocarbons, typified by crude petroleum in amounts up to 0.w %; and it may also contain in suspension, insoluble solids, typically in amount up to say 0.w %.

Other aqueous media which may be treated by the process of this invention include various waste waters from industrial sources. For background on the problems generated by these liquids and some attempts to solve those problems, the following may be noted:

(i) European patent 251,691 to the Water Research Commission, Transvaal, South Africa as assignee of Buckley et al published January 7, 1988;

(ii) Simpson et al *The Effect of pH on the Nanofiltration of the Carbonate System in Solution*, Desalination 1 64 (1987) pp 305–319;

(iii) Bindoff et al *The Nanofiltration and Reuse of Effluent from the Caustic Extraction Stage of Wood Pulping*, Desalination 67 (1987) pp 455–465;

(iv) Mickley *A Charged Ultrafiltration Membrane Process for Water Softening* IDA Journal 1 (1) (1985) March, pp 1–14;

(v) Koros et al *Polymeric Membrane Materials : Solution Diffusion Based Permeation Separations* (private Communication);

(vi) Somerville et al *Environmental Effect of Produced Water from North Sea Oil Operations*. Marine Pollution Bull., 18 (10) (1987) p 549–558;

(vii) C. S. Fang et al *Air Stripping for Treatment Produced Water* J. Petroleum Technology May (1989) p 619–624;

(viii) P. Eriksson *Nanofiltration Extends the Range Membrane Filtration* Environmental Progress 7 (1) (1988);

(ix) K. J. Keda et al *New Composite Charged Reverse Osmosis Membrane* Desalination 68 (1988) 109–119

No completely economically satisfactory solution to the problem has been found—particularly as it relates to the treatment of produced water on offshore drilling platforms—to yield a water of sufficient purity so that it meets governmental discharge limits applicable to water which is discharged into the sea.

Prior attempts to clean produced water have included the use of settling and/or skimming basins; but these have not proven to be economically desirable because inter alia they are unable to remove solubilized organics. Other technologies such as carbon adsorption have not proven to be economically desirable because they are characterized by size and weight which are undesirably high when measured against the limitations of e.g. an offshore drilling platform.

Processes utilizing reverse osmosis membranes have not been found to be satisfactory because their productivity is extremely low due inter alia to their high rejection of salts such as sodium chloride—which create an undesirably high osmotic pressure across the membrane.

Prior art attempts to solve the problem have not satisfactorily yielded a technique which has been found to satisfactorily remove water-soluble organic electrolytes from the aqueous waters.

It is an object of this invention to provide a novel process for treating an aqueous charge liquid to attain a product containing a lesser amount of water-soluble organic electrolytes. Other objects will be apparent to those skilled in the art.

STATEMENT OF THE INVENTION

In accordance with certain of its aspects, this invention is directed to a method of treating an aqueous charge liquid having a low charge pH and containing dissolved water-soluble organic electrolytes which comprises raising the pH of said aqueous charge thereby forming an alkalized aqueous charge liquid containing dissolved water-soluble organic electrolytes;

nanofiltering said alkalized aqueous charge containing dissolved water-soluble organic electrolytes thereby forming (i) aqueous retentate containing an increased concentration of dissolved water-soluble organic electrolytes and (ii) aqueous permeate containing a decreased concentration of dissolved water-soluble organic electrolytes;

recovering said aqueous retentate containing an increased concentration of dissolved water-soluble organic electrolytes; and recovering said aqueous permeate containing a decreased concentration of dissolved water-soluble organic electrolytes.

DESCRIPTION OF THE INVENTION

The aqueous charge liquids which may be treated by the process of this invention may include liquids derived from a wide variety of sources. These liquids may include various process liquids containing water-soluble organic electrolytes which one may desire to treat either to recover a liquid of greater purity or a liquid containing a higher concentration of water-soluble organic electrolytes. It may be possible to utilize the process of this invention to attain aqueous solutions containing water-soluble organic electrolytes in higher purity (i.e. in higher concentration); it may be possible to utilize the process of this invention to attain aqueous solution containing lower concentrations of water-soluble organic electrolytes.

One particular aqueous charge liquid which may be treated by the process of this invention may contain immiscible hydrocarbon liquid. These charge liquids may be aqueous liquids which contain immiscible hydrocarbons (including crude petroleum derived hydrocarbons or slop water as found in refinery operations) in amounts ranging from as low as parts per million amounts up to high percentages i.e. up to liquids which may be characterized as crude petroleum containing 20–80 w %, say 50 w % sea water.

In a typical off-shore drilling operation, the aqueous liquid of particular interest may be produced water. Produced water is water recovered with hydrocarbons from the well and includes injected water (that injected into the well to assist in displacement of the oil) and formation water (that which is found in the well with the oil).

This produced water may contain:

(i) Inorganic soluble salts typified by the normal soluble components of sea water;

(ii) Inorganic insoluble salts typified by finely divided particles of e.g. calcium carbonate, calcium sulfate etc. or by soluble salts present in excess of their solubility;

(iii) Water-soluble organic electrolytes (WSOE) non-hydrocarbon organic matter such as salts of lower aliphatic carboxylic acids including acetic, propionic, butyric, etc. or naphthenic acids;

(iv) Soluble hydrocarbons typified by the volatile hydrocarbons including benzene, toluene, xylene, etc;

(v) Insoluble hydrocarbons typified by the crude petroleum found in produced water.

An illustrative produced water obtained on an offshore drilling platform may contain:

TABLE

| Component | Milligrams per liter mg/l | |
|---|---|---|
| | Broad | Typical |
| Soluble inorganic salts | 100–10,000 | 5000 |
| Insoluble inorganic salts | 10–500 | 100 |
| Soluble organic electrolytes WSOE | 0.5–500 | 500 |
| Insoluble organic salts | 10–500 | 100 |
| Soluble hydrocarbons | 3000–50,000 | 3000 |
| Insoluble hydrocarbons | 30,000–300,000 | 150,000 |

Superficially the aqueous charge may typically contain 20–80 w %, say 50 w % water and 20–80 w %, say 50 w % immiscible hydrocarbon liquid.

The aqueous charge liquids which may be treated by the process of this invention include liquids commonly having a pH below 7 and typically 4–7, say about 4.4–6.

The aqueous charge liquid containing immiscible hydrocarbon liquid may be maintained in a quiescent separating operation. The liquid may be maintained in the settling operation at 30° C.–90° C., say 50° C. for 6–48 hours, say 12 hours. During this period, there is formed a supernatant lighter layer of hydrocarbon liquid and a heavier layer of aqueous liquid containing a reduced amount of immiscible hydrocarbon liquid.

Typically the supernatant lighter layer of hydrocarbon liquid may be 20–80 wt %, say 50 wt % of the total. This supernatant lighter layer may typically contain less than 2 wt %, say 0.1–1 wt % of aqueous liquid; and it may be withdrawn and passed to oil recovery i.e. passed as dry crude to storage for further processing.

The heavier layer of aqueous liquid, containing a reduced amount of immiscible hydrocarbon liquid, typically 0.01 w %–0.5 w %, say 0.1 w %, is passed to a quiescent skimming operation. Here the body of liquid is maintained at 30° C.-90° C., say 40° C. for 6-48 hours, say 12 hours. During this quiescent period, the reduced amount of residual hydrocarbon separates and forms an upper lighter layer of hydrocarbon liquid which may be skimmed off and, if desired, recycled to the quiescent separating operation.

The lower layer of aqueous liquid formed in the skimming operation may contain a decreased amount of immiscible hydrocarbon liquid typically in amount of 20-400 (w) ppm, say 160 (w) ppm. This lower layer of aqueous liquid containing a decreased amount of immiscible hydrocarbon liquid may be withdrawn from the skimming operation and passed to a nanofiltration operation.

The aqueous liquid to be charged to nanofiltration may typically be an aqueous solution of low pH, typically 4-7, say 6 containing principally organic, typically aliphatic carboxylic acids in amount of 300-1000, say 600 mg/l. In a preferred embodiment, the aqueous liquid may be a produced water which has been subjected to preliminary settling and/or skimming to yield an aqueous liquid containing the following:

TABLE

| Component | Milligrams per liter mg/l | |
|---|---|---|
| | Broad | Typical |
| Soluble inorganic salts | 1000-100,000 | 40,000 |
| Soluble organic electrolytes WSOE | 50-800 | 550 |
| Soluble hydrocarbons | 5-50 | 30 |
| Insoluble hydrocarbons | 30-300 | 150 |

THE MEMBRANE ASSEMBLY

Practice of the process of this invention may be carried out by passing the charge aqueous layer to a nanofiltration operation. Nanofiltration may be carried out by use of a composite structure which in one preferred embodiment may include a carrier layer which provides mechanical strength, a porous support layer, and a nanofiltering separating layer or membrane across which nanofiltration occurs.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, non-woven fibrous polyester.

A preferred non-woven polyester carrier layer may be formulated of non-woven, thermally-bonded strands of polyester and characterized by a fabric weight of 80±8 grams per square yard, a thickness of 4.2±0.5 mils, a tensile strength (in the machine direction) of 31 psi and (in cross direction) of 10 psi, and a Frazier air permeability of 6 cu. ft/min./sq. ft. @ 0.5 inches of water.

THE POROUS SUPPORT LAYER

The porous support layer useful in practice of the process of this invention may be preferably formed of a sheet of polysulfone polymer. Typically the polysulfone may be of thickness of 40-80 microns, say 50 microns and of molecular weight $\overline{M}n$ of 5,000-100,000, preferably 20,000-60,000, say 40,000. The polysulfone is preferably characterized by a pore size of less than about 500 A and typically about 200 A. This corresponds to a molecular weight cut-off of about 20,000.

The sulfone polymers which may be employed may include those made from cumene, containing isopropylidene groups in the backbone e.g.

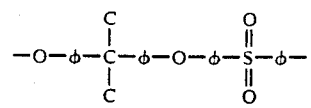

These isopropylidene sulfones, containing as repeating units ether-aromatic-isopropylidene-aromatic-ether-aromatic-sulfone-aromatic groups, may typically have a molecular weight $\overline{M}n$ of 15,000-30,000, a water absorption (at 20° C.) of about 0.85 w %, a glass transition temperature of 449° K., a density of 1.25 mg/m³, a tensile strength (at 20°/C.) at yield of 10,000 psi, and a coefficient of linear thermal expansion of $1.6 \times 10^{-5}$ mm/mm/°C.

Sulfone polymers which may be employed in practice of the process of this invention, may include those which are free of isopropylidene moieties in the backbone chain and wherein the phenylene groups in the backbone are bonded only to ether oxygen atoms and to sulfur atoms. These polymers, which may typically be prepared from

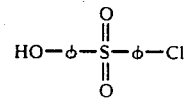

may be characterized by a backbone containing the following repeating groups:

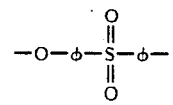

A sulfone polymer which may be employed may be a polyether sulfone which is free of isopropylidene moieties in the backbone chain and wherein the phenylene groups in the backbone are bonded only to ether-oxygen atoms and to sulfur atoms. This polymer may be characterized by molecular weight $\overline{M}n$ of 25,000, water absorption @ 20° C. of 2.1 w %, glass transition temperature of 487.K, tensile strength at yield of 2,200 psig at 20° C.; and coefficient of linear thermal expansion of $5.5 \times 10^{-5}$ mm/mm/°C. This polymer has a molecular weight cut off of about 20,000 and a pore size of about 200 A.

THE SEPARATING LAYER

The separating layer which permits nanofiltration in accordance with this invention includes a non-porous film, membrane, or separating layer of 0.2-1 microns, say about 0.2 microns thickness. The nanofiltration membrane is characterized inter alia by presence of a pendant ionic group which provides an ionic charge to the membrane. Although the pendant ionic group may be cationic (e.g. $NH_4+$, $M^+$, etc.), in the preferred embodiment it is anionic. Typical preferred anionic pendant groups may include oxygen-containing groups which contain an ionizable group, preferably hydrogen, $-COOH$, $-SO_3H$, and $-H_2PO_4$. The preferred anionic pendant group may be carboxyl $-COOH$.

The preferred nanofiltration membrane may be a condensation product of (i) a polyfunctional (preferably difunctional) amine and a (ii) polycarboxylic acid which contains a pendant ionic group.

The polyfunctional amines which may be employed may be aliphatic or aromatic amines characterized by the formula $R\ (NH_2)_a\ (NH)_b$ wherein a and b, are integers or 0 and a plus b is at least two. The amine may be a primary or secondary amine. For purpose of simplicity, the R group will be designated as the monofunctional group, e.g. ethyl, although clearly, in the polyfunctional amine the R group will bear more than one amine group as in ethylene diamine. It will be apparent that the R group may be cyclized as in piperazine or that more than one R group may be present as in secondary amines.

In the above compound, R may be a hydrocarbon group selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl cycloalky, ether, etc. Typically inertly substituted R groups may include 2-ethoxyethyl, carboethoxymethyl, 4-methycyclohexyl, 3-ethyl-5methylphenyl, etc. The preferred R groups may be lower alkyl, i.e. $C_1$–$C_{10}$ alkyl, groups including eg methyl, ethyl, n-propyl, i-propyl, butyls, amyls, hexyls, octyls, decyls, etc. R may preferably be ethyl.

Illustrative amines which may be employed may include:

TABLE

| | |
|---|---|
| ethylene | diamine |
| triethylene | diamine |
| tetramethylene | diamine |
| pentamethylene | diamine |
| 1,3,5-triamino | pentane |
| 1,4-diamino | benzene |
| bis (2-aminoethyl) | amine |
| bis (2-aminomethyl) | amine |

A preferred type of polyfunctional amine may be heterocyclic amines such as:

TABLE

| |
|---|
| piperazine |
| pyrazolidine |
| imidazolidine |
| triazolidine |

The preferred polyfunctional amine may be piperazine.

The polycarboxylic acid which contains a pendant ionic group may be characterized by the formula $R'\ (COOH)_e\ (X)_f$ wherein e is an integer greater than 1 (and preferably 2) and f is 0 or an integer. When e is 2, f is at least 1, and preferably 1. In the preferred embodiment, trimesic acid which contains three carboxyl groups, e is 2, X is carboxyl, and f is one. X is a pendant ionic group. X may be an unreacted carboxylic group in the final polymer. Alternately X may for example be a sulfonate or a phosphate group on the polycarboxylic acid.

For the purpose of simplicity, the R' group will be nomenclated as the monofunctional group, e.g. phenyl, although clearly the polycarboxylic acid will bear more than one carboxyl group as in the preferred embodiment.

In the above compound R, may be a hydrocarbon selected form the group consisting of alkyl, aralkyl, cycloalkyl, aryl, and alkaryl, including such radicals when inertly substituted. When R' is alkyl, it may typically be methyl, ethyl, n-propyl, iso-propyl, n-butyl, i-butyl, sec-buty, amyl, octyl, decyl, octadecyl, etc. When R' is aralkyl, it may typically be benzyl, beta-phenylethyl, etc. When R' is cycloalkyl, it may typically be cyclohexyl, cycloheptyl, cyclooctyl, 2-methycycloheptyl, 3-butylcyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear a n on-reactive substituent such as alkyl, aryl, cycloalkyl, ether, halogen, nitro, etc. Tupically inertly substituted R' groups may include 3-chloropropyl, 2-ethoxyethyl, carboethoxymethyl, 4-methyl cyclohexyl, etc. The preferred R' groups may be lower alkyl, i.e. $C_1$–$C_{10}$ alkyl, groups including e.g. methyl, ethyl, n-propyl, i-propyl, butyls, amyls, hexyls, octyls, decyls, etc.

The polycarboxylic acid (which may preferably be employed as its acid halide as in trimesoyl trichloride) may include the following:

TABLE

| |
|---|
| hemimellitic acid |
| trimellitic acid |
| trimesic acid |
| prehnitic acid |
| mellophanic acid |
| pyromellitic acid |
| mellitic acid |

Sulfonated phthalic (or isophthalic or terephthalic) acids may be employed.

Although the acids may be preferably employed in the form of their polyhalides (preferably the trichlorides such as trimesoyl trichloride), it is convenient to refer to the reactant as the acid.

A preferred nanofiltration membrane may bve the polymer prepared by reaction of piperazine and trimesoyl chloride:

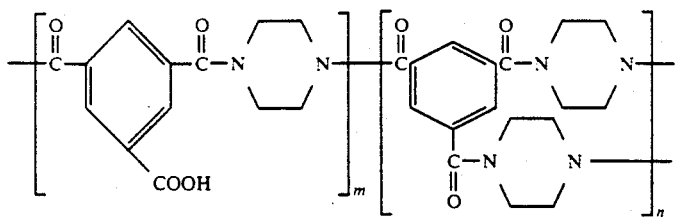

In this polymer, repeat group m is typically present in amount of 15–100 mole %, say 95 mole % and repeat group n is typically present in amount of 0–50, say 5 mole %. Typical film thickness may be 0.05, say 0.2 microns. It is apparent that in this preferred embodiment, the pendant ionic group is the unreacted carboxyl group—COOH.

A typical useful commercially available nanofiltration membrane which may be employed may include the Film Tech NF-40 brand membrane containing approximately equimolar amounts of moieties derived from piperazine and trimesoyl chloride—of film thickness of about 0.2 microns. This membrane is characterized by the presence of pendant anionic carboxyl groups.

THE COMPOSITE MEMBRANE

It is a feature of this invention that it may utilize a composite membrane which comprises (i) an optional carrier layer characterized by porosity and mechanical strength for supporting a porous support layer and a nanofiltration separating layer, (ii) a porous support layer such as a polysulfone membrane of molecular weight $\overline{M}n$ of 5,000–100,000, of thickness of 10–80 microns, and of molecular weight cutoff of 25,000–100,000 and (iii) as a nanofiltration separating layer, a condensation product of (i) a polyfunctional amine and (ii) a polycarboxylic acid which contains a pendant ionic group, preferably a pendant carboxyl group.

The composite membrane of this invention may be utilized in various configurations. It is, for example, possible to utilize the composite in a plate-and-frame configuration in which separating layers may be mounted on the porous support layer with the carrier layer.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from by-passing the operative membrane system and insures that fluid enters the system principally at one end. The permeate passes from the feed channel, into contact with the separating layer and thence therethrough into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid or vapor which permeates the membrane passes into the volume occupied by the permeate spacer and through this permeate channel to the perforations in the cylindrical conduit through which it is withdrawn form the system. In this embodiment, it will be apparent that the system may not include a carrier layer.

In another embodiment, it is possible to utilize the system of this invention as a tubular or hollow fiber. In this embodiment, the polysulfone porous support layer may be extruded as a fine tube with a wall thickness of typically 0.001–0.1 mm. The extruded tubes are passed through a bath which may contain a solution of the nanofiltration membrane polymer which is deposited on the support layer and cured in situ. A bundle of these tubes is secured (with an epoxy adhesive) at each end in a header; and the fibers are cut so that they are flush with the ends of the header. This tube bundle is mounted within a shell in a typical shell-and-tube assembly.

In operation, the charge liquid is admitted to the tube side and passes through the inside of the tubes and exists as retentate. During passage through the tubes, permeate passes through the non-porous separating layer and permeate is collected in the shell side.

In this embodiment, it will be apparent that the system may not normally include a carrier layer. In still another embodiment, the porous support layer may be omitted; and the separating layer is extruded and thereafter cured in situ prior to mounting in the headers.

NANOFILTRATION

It is a feature of the process of this invention that the water-soluble organic electrolyte may be more effectively separated from the typically acidic charge aqueous liquids in which they are found by increasing the pH of the liquid prior to nanofiltration. The low pH charge liquids may be characterized by a pH as low as say about 3-4 or as high as 10-11; and it is found that the % Rejection of WSOE may be desirably increased by raising the pH of the charge liquid.

As will be apparent, the degree of improvement which may be attained may be greater when the pH of the charge prior to treatment is at the lower end of the range (e.g. say 3-7) than is attained at the upper end of the range (e.g. say 10-11). Although commercially useful results may be attained when the charge liquid has a pH of say 4-9 (this being adjusted to say 7-11), it appears that most desirable results in terms of the economic balance between the cost of the reagent added to increase the pH and the ability to increase the WSOE Rejection is attained when the charge liquid of pH 4-7, is treated to increase the pH to above 7, preferably to 7-9, say to about 8.0-8.5.

It should be noted that increasing the pH above about 3.8 increases the % WSOE Rejection over the range of 3.8-11. The Flux increases as the pH is raised to about 4.8 and remains reasonably constant thereafter as the pH increase to about 11.

Thus when dealing with the typical charge liquids which have a pH of 3-7, say 6.5, it is found desirable to increase the pH to a point above about 7, preferably 7-9, say about 8.5. Although some improvement may be attained by raising the pH to a level below 7 (e.g. say 6-7), more significant improvement in Flux and Rejection are attained by increasing the pH to above about 7. Similarly although it is possible to attain increased Rejection (although not Flux) by operating at pH above about 9, the incremental benefits of the increased Rejection appear to be offset by the cost of adjusting the pH.

The pH of the aqueous liquid may be adjusted by a variety of techniques. It may be effected for example by passage through a bed of cation exchange resin (such as a sulfonated polystyrene), or more commonly by addition of a Bronsted base, typified by sodium carbonate, sodium hydroxide, sodium bicarbonate, etc.

It will be apparent, however, that although addition of Bronsted bases such as sodium acetate or trisodium phosphate for example may increase the pH to desired level, they are undesirable in that they introduce undesirable anions into the system. The preferred bases include hydroxides of alkali metals and most preferably sodium hydroxide.

When the Bronsted base is employed, it is preferred to use sodium hydroxide. In the case of sea water of pH 5.5, it may be found that 20-80, say 40 milligrams per liter of sodium hydroxide (i.e. 40 ml of 0.1 N aqueous NaOH per liter of charge liquid) may be sufficient to raise the pH to desired level of about 8.5.

In practice of the process of this invention, aqueous charge in liquid phase may be at 20° C.-90° C., say 40° C. and 50-300 psig, say 200 psig. A pressure drop of 35-285, say 185 psig is commonly maintained across the membrane.

The permeate which passes through the nanofiltration system includes water, soluble inorganic monovalent salts typified by the normal soluble components of sea water in which the anious are monovalent; and soluble hydrocarbons, typified by benzene, toluene, xylene, etc.

The retentate which is retained by the nanofiltration system includes water; insoluble inorganic salts; water-soluble organic electrolytes WSOE typified by salts of organic acids; insoluble hydrocarbons typified by crude petroleum found in produced water.

When nanofiltering the illustrative specific produced water at pH 7-8 obtained on an off-shore drilling platform, tabulated supra, the permeate and retentate may be as follows:

TABLE

PERMEATE

| Component | Milligrams per liter | |
|---|---|---|
| | Broad | Typical |
| Water Soluble Inorganic salts | 900-90,000 | 35,000 |
| Water Soluble organic electro-lytes | 10-150 | 100 |
| Water Insoluble organics | 1-15 | 3 |
| Water Soluble hydrocarbons | 5-50 | 30 |

Superficially the permeate may typically contain water and 1-15 mg/l, say 3 mg/l immiscible hydrocarbon liquid.

TABLE

RETENTATE

| Component | Milligrams per liter | |
|---|---|---|
| | Broad | Typical |
| Water Soluble Inorganic salts | 1400-140,000 | 55,000 |
| Water Soluble organic electro-Lytes | 1800-2800 | 1900 |
| Water Insoluble organics | 120-1200 | 600 |
| Water Soluble hydrocarbons | 5-50 | 30 |

Superficially the retentate may typically contain aqueous liquid and 120-1200 mg/l, say 600 mg/l immiscible hydrocarbon liquid.

It is a feature of the nanofiltration process of this invention that it is possible to treat a charge aqueous liquid containing a water-soluble organic electrolyte, typically in amount of 50-800 mg/l, say 550 mg/l to attain a permeate containing a substantially decreased amount of water-soluble organic electrolyte, typically in amount of 10-150 mg/l, say 100 mg/l. For example, if one treats an aqueous solution containing say 250 mg/l per liter of hexanoic acid (solubility in water of about 1.0 g/100 ml) by the nanofiltration process of this invention, it is readily possible to attain a permeate which contains as little as 25 wppm of hexanoic acid. Clearly the content of water-soluble organic electrolyte in the permeate will depend on a variety of factors including the WSOE content of the charge, the pH of the charge, the pH to which the charge is adjusted in accordance with this invention, the temperature and pressure of nanofiltration, the charge liquid, flow rate, the extent of the membrane surface, etc.

Nanofiltration may typically be carried out at a flux of 5-100, say 30 gallons per square foot per day with a typical rejection (measured in terms of 100 times the weight of WSOE retained in the Retentate divided by the weight of WSOE in the Feed) of 50-97% of the divalent salts and 100% of the emulsified hydrocarbon.

DESCRIPTION OF SPECIFIC EMBODIMENTS

EXAMPLE I

In this example which represents the best mode presently known of carrying out the process of this invention, the aqueous charge liquid is a synthetic blend representing a typical produced water from a Gulf Coast oil-well drilling operations which has been subjected to separation and skimming operations to yield an aqueous charge liquid (five liters) of pH 4.4 containing the following:

TABLE

| Component | WPPM |
|---|---|
| Sodium Chloride | 40,000 |
| Sodium Bicarbonate | 250 |
| Hexanoic Acid | 50 |
| Acetic Acid | 400 |

In practice of the process of this invention, there is added to the charge solution sodium hydroxide in amount of 96 mg/liter with agitation at ambient temperature of 25° C. (Although it may be possible to add the sodium hydroxide as a solid, it is preferred to add it as a solution: 100 ml of 0.1 N NaOH to four liters of charge). The amount added is sufficient to bring to pH up to about 8.1.

In this example, which represents the best mode presently known of carrying out the process of this invention, the nanofiltration separation layer is mounted on a porous support layer of a commercially available (from Film Tec Corp) composite containing a non-woven polyester backing as carrier layer bearing, as a porous support layer, a polyether polysulfone polymer.

The carrier layer employed is a porous, flexible, non-woven fibrous polyester formed of thermally bonded strands and characterized by a fabric weight of 80±8 grams per square yard, a thickness of 4.2±0.5 mils, a tensile strength (in the machine direction) of 31 psi and (in the cross direction) of 10 psi, and a Frazier air permeability of 6 cu. ft/mm/sq. ft @ 0.5 inches of water.

The porous support layer, which is mounted on the carrier layer is a sheet of polyether polysulfone polymer (which is free of isopropylidene moieties in the backbone chain) wherein the phenylene groups in the backbone are bonded only to ether-oxygen atoms and to sulfur atoms. This polymer may be characterized by molecular weight $\overline{M}n$ of 25,000, water absorption at 20° C. of 2.1 w %, glass transition temperature of 487.K, tensile strength at yield of 2200 psig at 20° C., coefficient of linear thermal expansion of $5.5 \times 10^{-5}$ mm/mm/°C. This polymer has a molecular weight cutoff of about 20,000 and a pore size of about 200 A.

The nanofiltration membrane is the commercially available Film Tec NF-40 membrane of thickness of 0.2 microns. The membrane is made by condensation polymerization of piperazine and trimesoyl chloride and contains approximately equimolar quantities of units derived from the former and from the latter. It has the formula:

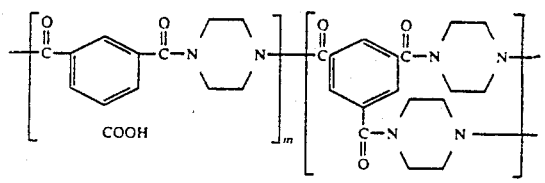

The so-bonded assembly is mounted on a framework in a nanofiltration cell to which is admitted at temperature of 40° C. and pressure of 200 psig, the charge aqueous liquid.

The permeate recovered (at a Flux of 33.8 gfd) is characterized as follows:

TABLE

| Compound | WPPM |
|---|---|
| Sodium Chloride | 36,000 |
| Hexanoic and Acetic Acid | 273 |

This represents a rejection of 45.4% of the hexanoic and acetic acids and 10% of the sodium chloride.

EXAMPLE II*

In this Example, the feed of Example I is employed except that no sodium hydroxide solution is added. The pH of the feed is 4.4. Charge is at 200 psig and 40° C.

The permeate recovered (at a Flux of 17.8 gfd) contains

TABLE

| Component | WWPM |
|---|---|
| Sodium Chloride | 36,000 |
| Hexanoic and Acetic Acid | 430 |

This represents a rejection of only 8.1% of hexanoic and acetic acids and 10% rejection of sodium chloride.

It will be apparent to those skilled in the art that:
(i) The content of water-soluble organic electrolytes WSOE in the charge (450 wppm) has been reduced to 273 wppm to in the permeate.
(ii) This has been effected at a Rejection of 10 w % of the water-soluble inorganics (NaCl).
(iii) This has been effected at a Rejection of 45.4 w % of the water-soluble organic electrolytes (hexanoic plus acetic acids.
(iv) This has been effected at a flux of 33.8 gfd. (Note that a flux of gfd, gallons per square foot per day, may be converted to kmh, kilograms per square meter per hour, by dividing gfd by 0.59).
(v) The permeate recovered in Experimental Example I desirably contains only 63% (i.e. 273/430) of the amount of undesired hexanoic acid recovered in Control Example II* wherein the pH has not been adjusted.

EXAMPLES III*–XVIII

In this series of examples, the charge aqueous liquid is distilled water containing 40,000 ppm (w) of sodium chloride. In control Examples III*, V*, VII*, and IX* no water-soluble organic is present. In Experimental Examples IV, VI, VIII, X–XI, XIII–XVI and XVIII there is added 250 ppm (w) of the noted acid. In Experimental Example XVII, there are added equal parts by weight (125 ppm each) of acetic acid and hexanoic acid. Experimental Example XV treated a charge liquid containing only 125 ppm (w) of hexanoic acid. Nanofiltration is carried out at 40.C and 200 psig charge pressure using the membrane of Example I.

The pH of the charge liquid is as noted. In each case, the pH is adjusted by addition of sodium bicarbonate solution to the noted value.

TABLE

| | | | | Permeate | | |
|---|---|---|---|---|---|---|
| Exam-ple | Organic Acid | Base Added | Final pH | % Rej Salt | % Rej WSOE | Flux gfd |
| III* | None | None | 6 | 13 | — | 28.8 |
| IV* | Hexanoic | None | 3.7 | 10 | 0 | 14.3 |
| V* | None | None | 6 | 8 | — | 24.7 |
| VI* | Heptanoic | None | 3.5 | 18 | 0 | 16.4 |
| VII* | None | None | 6 | 7 | — | 21.3 |
| VIII | Octanoic | None | 3.8 | 10 | 0 | 13.3 |
| IX* | None | None | 6 | 8 | — | 14.3 |

TABLE-continued

| Example | Organic Acid | Base Added | Final pH | Permeate % Rej Salt | Permeate % Rej WSOE | Flux gfd |
|---|---|---|---|---|---|---|
| X | Benzoic | None | 3.5 | 10 | 0 | 11.3 |
| XI | Hexanoic | NaOH | 11 | 10 | 79 | 30.1 |
| XII* | Hexanoic | NaOH | 6.5 | 6 | 66 | 26.2 |
| XIII | Hexanoic | NaOH | 4.7 | 5 | 29 | 25.9 |
| XIV | Hexanoic | NaHCO$_3$ | 6 | 6 | 71 | 21.9 |
| XV | Hexanoic | NaHCO$_3$ | 6.6 | 8 | 84 | 32.9 |
| XVI | Valeric | NaHCO$_3$ | 5.9 | 10 | 72 | 31.6 |
| XVII | Acetic } Hexanoic } | NaHCO$_3$ | 5.4 | 6 | 60 | 30.7 |
| XVIII | Hexanoic | NaHCO$_3$ | 7.0 | 6 | 82 | 30.9 |

From the above Table, the following may be noted:

(i) In Control Examples III*-X* wherein no Bronsted base is added, the Rejection of WSOE is zero. This is unsatisfactory.

(ii) As the pH is increased by addition of NaOH or NaHCO$_3$, the % Rejection of WSOE desirably increases the Flux desirably increases, and the % Rejection of Salt is maintained at a low level in the Experimental Examples;

(iii) A comparison for example of Experimental Example XI with Control Example VI* shows that practice of the process of this invention makes it possible to desirably increase the % Rejection of WSO from 0% up to 79% and to desirably increase the Flux by a factor of almost 2 (30.1/16.4) while cutting the % Rejection of Salt almost in half (10/18).

Although it is clearly possible to attain some improvement in Flux and Rejection by increasing the pH up to say about 4.7, clearly the % Rejection reaches a satisfactory level when the pH is adjusted to 7 or above. It is also apparent that the % Rejection continues to increase at least up to pH of about 11; but an economic balance between % Rejection and the cost of increasing the pH indicates that the pH may preferably be adjusted to above 7, and preferably 7-9, say about 8.5.

Results comparable to those of Example I may be obtained using other nanofiltration membranes (including those bearing other pendant anionic groups).

Results comparable to those of Example I may be obtained using other Bronsted bases to increase the pH:

TABLE

| Example | Bronsted Base |
|---|---|
| XIX | Potassium Hydroxide |
| XX | Lithium Hydroxide |
| XXI | Magnesium Hydroxide |
| XXII | Calcium Hydroxide |
| XXIII | Cesium Hydroxide |

EXAMPLE XXXIV*-XXXV

In control Example XXXIV*, the charge is a sample of produced waste water (pH 3.2) from a producing platform in the Gulf of Mexico.

This charge is subjected to nanofiltration at 40° C. and 200 psig for one hour utilizing the membrane system (and procedure) of Example I. The Flux (gfd) is 32.20 and the Rejection is 35%.

In experimental Example XXXV, there is added to the produced waster water enough sodium hydroxide (as an aqueous solution) to increase the pH to 8.7. This liquid is then subjected to nanofiltration at 40° C. and 200 psig for one hour utilizing the membrane system (and procedure) of Example I. The Flux is 32.20 and the Rejection is 75%. The pH of the retentate at the conclusion of the run is 7.

Although this invention has been illustrated by reference to specific embodiments, it will be apparent to those skilled in the art that various charges and modifications may be made which clearly fall within the scope of the invention.

What is claimed is:

1. The method of treating an aqueous charge liquid having a low charge pH and containing dissolved water-soluble organic electrolytes which comprises
   raising the pH of said aqueous charge thereby forming an alkalized aqueous charge liquid containing dissolved water-soluble organic electrolytes;
   nanofiltering said alkalized aqueous charge containing dissolved water-soluble organic electrolytes thereby forming (i) aqueous retentate containing an increased concentration of dissolved water-soluble organic electrolytes and (ii) aqueous permeate containing a decreased concentration of dissolved water-soluble organic electrolytes;
   recovering said aqueous retentate containing an increased concentration of dissolved water-soluble organic electrolytes; and
   recovering said aqueous permeate containing a decreased concentration of dissolved water-soluble organic electrolytes.

2. The method of treating an aqueous charge liquid as claimed in claim 1 wherein said aqueous charge liquid has a low charge pH of below about 7.

3. The method of treating an aqueous charge liquid as claimed in claim 1 wherein said aqueous charge liquid has a low charge pH of about 5-7.

4. The method of treating an aqueous charge liquid as claimed in claim 1 wherein said low charge pH is raised to above about 7.

5. The method of treating an aqueous charge liquid as claimed in claim wherein said dissolved water-soluble organic electrolytes include anions of organic monocarboxylic acids.

6. The method of treating an aqueous charge liquid as claimed in claim 1 wherein said aqueous charge liquid having a low charge pH contains immiscible hydrocarbons.

7. The method of treating an aqueous charge liquid as claimed in claim 1 wherein the pH of said aqueous charge liquid having a low charge pH is raised by addition thereto of a Bronsted base.

8. The method of treating an aqueous charge liquid as claimed in claim 1 wherein the pH of said aqueous charge liquid having a low charge pH is raised by addition thereto of a hydroxide, carbonate, or bicarbonate of an alkali metal.

9. The method of treating an aqueous charge liquid as claimed in claim 1 wherein the pH of said aqueous charge liquid having a low charged pH is raised by contacting said low pH charge with a cation exchange resin.

10. The method of treating an aqueous charge liquid as claimed in claim 9 wherein the cation exchange resin is a sulfonated polystyrene.

11. The method of treating an aqueous charge liquid as claimed in claim 1 wherein said nanofiltration is carried out across a nanofiltration membrane of thickness of 0.2-1 microns, said membrane comprising a pendant ionic group which provides an ionic charge.

12. The method of treating an aqueous charge liquid as claimed in claim 1 wherein said nanofiltration is carried out across a nanofiltration membrane which is a condensation product of a polyfunctional amine and a polycarboxylic acid which acid contains a pendant ionic group.

13. The method of treating an aqueous charge liquid containing produced water of low charge pH of about 4-7 from a petroleum producing operation, said charge liquid containing dissolved water-soluble organic electrolytes which comprises raising the pH of said aqueous charge liquid thereby forming an alkalized aqueous charge liquid containing dissolved water-soluble organic electrolytes;

nanofiltering said alkalized aqueous charge containing dissolved water-soluble organic electrolytes thereby forming (i) aqueous retentate containing an increased concentration of dissolved water-soluble organic electrolytes and (ii) aqueous permeate containing a decreased concentration of dissolved water-soluble organic electrolytes;

recovering said aqueous retentate containing an increased concentration of dissolved water-soluble organic electrolytes; and recovering said aqueous permeate containing a decreased concentration of dissolved water-soluble organic electrolytes.

14. The method of treating an aqueous charge liquid containing produced water as claimed in claim 13 including the steps of (i) separating said aqueous charge liquid, prior to nanofiltration, in a separation operation thereby forming a separated lighter layer of immiscible hydrocarbon liquid and a heavier layer of aqueous liquid containing a reduced amount of immiscible hydrocarbon liquid; (ii) recycling said heavier layer of aqueous liquid containing a reduced amount of immiscible hydrocarbon liquid to said pH raising step, and (iii) recovering said separated lighter layer of immiscible hydrocarbon liquid.

15. The method of treating an aqueous charge liquid having a low charge pH of 3-7 and containing dissolved water-soluble organic electrolytes which comprises raising the pH of said aqueous charge liquid to 7-11 thereby forming an alkalized aqueous charge liquid of pH 7-11 containing dissolved water-soluble organic electrolytes;

nanofiltering said alkalized aqueous charge liquid of pH 7-11 containing dissolved water-soluble organic electrolytes thereby forming (i) aqueous retentate containing an increased concentration of dissolved water-soluble organic electrolytes and (ii) aqueous permeate containing a decreased concentration of dissolved water-soluble organic electrolytes;

recovering said aqueous retentate containing an increased concentration of dissolved water-soluble organic electrolytes; and recovering said aqueous permeate containing a decreased concentration of dissolved water-soluble organic electrolytes.

* * * * *